United States Patent
Kamiguchi et al.

(10) Patent No.: US 6,409,495 B1
(45) Date of Patent: Jun. 25, 2002

(54) MOLD PROTECTION DEVICE FOR INJECTION MOLDING MACHINE

(75) Inventors: Masao Kamiguchi; Tatsuhiro Uchiyama; Masayuki Ueno, all of Yamanashi (JP)

(73) Assignee: Fanuc, Ltd., Yamanashi (JP)

( * ) Notice: Subject to any disclaimer, the term of this patent is extended or adjusted under 35 U.S.C. 154(b) by 190 days.

(21) Appl. No.: 09/618,730

(22) Filed: Jul. 18, 2000

(30) Foreign Application Priority Data

Jul. 19, 1999 (JP) .......................................... 11-204392

(51) Int. Cl.$^7$ ...................... B29C 45/66; B29C 45/76; B29C 45/84
(52) U.S. Cl. ..................... 425/150; 425/154; 425/173; 425/450.1; 264/40.1; 318/434; 318/565
(58) Field of Search ................................. 425/150, 589, 425/450.1, 173, 154; 264/40.1; 318/434, 565

(56) References Cited

U.S. PATENT DOCUMENTS

| | | | |
|---|---|---|---|
| 4,710,119 A | * 12/1987 | Otake | 425/136 |
| 4,785,221 A | * 11/1988 | Neko | 318/362 |
| 5,469,038 A | * 11/1995 | Silvey | 318/632 |

FOREIGN PATENT DOCUMENTS

JP        04368832 A        12/1992

* cited by examiner

*Primary Examiner*—Tim Heitbrink
*Assistant Examiner*—Donald Heckenberg
(74) *Attorney, Agent, or Firm*—Staas & Halsey LLP

(57) ABSTRACT

A mold protection device for an injection molding machine capable of automatically setting a reference value for detecting an abnormal load exerted on a mold in a mold closing process. A load exerted on a servomotor for driving a mold clamping mechanism is estimated by a disturbance estimating observer provided in a control system of the servomotor. The estimated disturbance torque is sampled at every predetermined period in a mold protection region and cyclically stored in a table TA as data DA (0, 0) to (i, j) in mold closing processes of the number (i+1). A predetermined amount is added to an average value of data DA (0, n) to (i, n) to define an upper limit DC(n) for the disturbance torque and stored in the table TC. If the estimated disturbance torque at each sampling period exceeds the upper limit DC(n) of in the mold protection region in a present mold closing process, an alarm is issued to indicate abnormal load. An optimum reference value for determining an abnormal load is automatically set for securely protecting the mold without requiring an operator to manually set the reference value.

8 Claims, 6 Drawing Sheets

| | 0 | 1 | ... | a | ... | i |
|---|---|---|---|---|---|---|
| 0 | DA(0,0) | DA(1,0) | ... | DA(a,0) | ... | DA(i,0) |
| 1 | DA(0,1) | DA(1,1) | ... | DA(a,1) | ... | DA(i,1) |
| 2 | DA(0,2) | DA(1,2) | ... | DA(a,2) | ... | DA(i,2) |
| . | . | . | ... | . | ... | . |
| n | DA(0,n) | DA(1,n) | ... | DA(a,n) | ... | DA(i,n) |
| . | . | . | ... | . | ... | . |
| j | DA(0,j) | DA(1,j) | ... | DA(a,j) | ... | DA(i,j) |

TB

| | B |
|---|---|
| 0 | DB(0) |
| 1 | DB(1) |
| 2 | DB(2) |
| . | . |
| n | DB(n) |
| . | . |
| j | DB(j) |

TC

| | C |
|---|---|
| 0 | DC(0) |
| 1 | DC(1) |
| 2 | DC(2) |
| . | . |
| n | DC(n) |
| . | . |
| j | DC(j) |

TE

| | E |
|---|---|
| 0 | DE(0) |
| 1 | DE(1) |
| 2 | DE(2) |
| . | . |
| n | DE(n) |
| . | . |
| j | DE(j) |

MOLD PROTECTION DEVICE FOR INJECTION MOLDING MACHINE

BACKGROUND OF THE INVENTION

1. Field of the Invention

The present invention relates to an injection molding machine, and more particularly to a mold protection device for preventing molds form being damaged by a molded product or other foreign matter nipped by the molds in a mold closing process of an injection molding operation.

2. Description of the Related Art

In the mold closing process, if a molded product or other foreign matter is nipped by the molds, the molds may be damaged by the nipped foreign matter. To prevent such event, there is known a mold protecting method in which a mold protection region is set in a movable range of a movable mold before a contact position of the molds to reduce an output of a driving source of a mold clamping mechanism in the mold protecting region so that the movable mold is driven by a low torque and at a low pressure, and the motion of the movable mold is stopped if the foreign matter is nipped between the molds.

Also, for an injection molding machine in which a servomotor is used as a drive source of the mold clamping mechanism for clamping the molds, a mold protection method is known from Japanese Patent Publication No. 4-368832 in which a disturbance torque exerted on the servomotor is estimated by a disturbance estimating observer provided in a velocity loop of a servo control system in a mold closing process and if the estimated disturbance torque exceeds a predetermined value, an alarm is issued to stop driving of the servomotor to protect the molds.

In the above method of protecting molds by issuing an alarm when the disturbance torque estimated by the disturbance torque estimating observer exceeds the reference value, since a different mold set has a different allowable load and a different friction torque in motion, the reference value for discriminating an abnormal load is different for each mold set. Therefore, it is necessary to set a different reference value every time when a mold set is changed to another mold set in the mold clamping mechanism. If a reference value larger than the optimum value is set, a load greater than the allowable value may be exerted on the mold to be damaged when the molds nip the foreign matter.

If a reference value smaller than the allowable maximum value, since a normal disturbance load varying with fluctuation of friction force of the mold clamping mechanism in a mold closing motion and temperature of the molds, the normal disturbance torque quite lower than the allowable value is detected as a abnormal load to issue an alarm to stop the mold closing motion, to lower efficiency of operation.

In view of the above, it is necessary to set an optimum reference value for accurate discrimination of an abnormal load. However, it requires an operator to have adequate knowledge and experience on molds and injection molding operation since the optimum reference value varies depending on structure and temperature of molds, and environment of an injection molding machine. Even for the operator having adequate knowledge and experience on the injection molding operation it is very difficult to determine an optimum reference value.

SUMMARY OF THE INVENTION

An object of the present invention is to provide a mold protection device for an injection molding machine capable of automatically setting a reference value for detecting an abnormal load exerted on a mold in a mold closing process based on an average value of the estimated disturbance torques without need of manual input operation by an operator.

The mold protection device of the present invention comprises a disturbance estimating observer for estimating a disturbance torque exerted on a servomotor for driving a mold clamping mechanism at least within a mold protection region in every mold closing process, and a controller for defining an upper limit of the disturbance torque based on an average of disturbance torques estimated by the disturbance estimating observer in a plurality of mold closing processes, and for issuing an abnormal signal when a disturbance torque estimated by the disturbance estimating observer in a present mold closing process exceeds the upper limit in the mold protection region.

The disturbance estimating observer may estimate the disturbance torque at every predetermined period, and the controller may define the upper limit of the disturbance torque at each predetermined period based on an average of disturbance torques estimated by said disturbance estimating observer at every predetermined period in a plurality of mold closing processes, and issue an abnormal signal when a disturbance torque estimated by the disturbance estimating observer in a mold closing process exceeds the upper limit at each predetermined period.

The controller may define the upper limit based on an average of disturbance torques estimated by the disturbance estimating observer in a latest series of mold closing processes.

The disturbance torque estimated in a mold closing process in which an abnormal signal is issued is excluded in calculation of the average value.

The mold protection device of the present invention may further comprise a manual data input device for inputting a set value for defining the upper limit value in combination with the average value, and a display device for graphically displaying the estimated disturbance torque in the present mold closing process, the average value and the upper limit vale in relation to time or a position of a movable mold. The display device may graphically display a deviation between the average value and the disturbance torque estimated in a present mold closing process in relation to time or a position of a movable mold.

The estimated disturbance torques in a predetermined number of first molding cycles of an automatic injection molding operation may be excluded in the calculation of the average value since motion of the movable mold is not stable in these number of first molding cycles. The predetermined number of first molding cycles can be manually set through the manual data input device.

BRIEF DESCRIPTION OF THE DRAWINGS

FIG. 6 shows tables provided in a data storage RAM; and

DETAILED DESCRIPTION OF THE PREFERRED EMBODIMENTS

Figure 1:
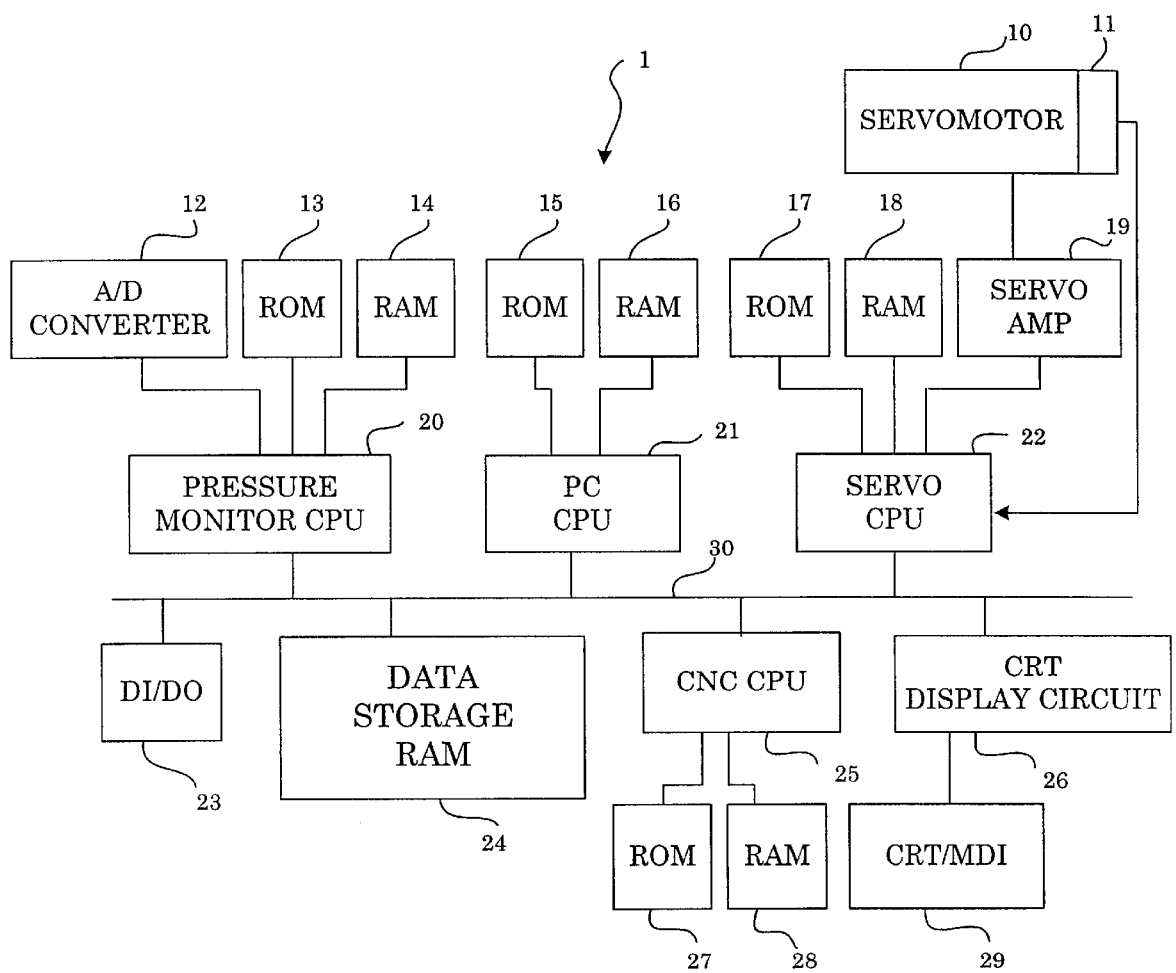
FIG. 1 is a block diagram of a controller for an injection molding machine, which serves as a mold protecting device of the present invention.

A controller for an injection molding machine which constitutes a mold protection device according to the present invention is shown as block diagram of FIG. 1. As shown in FIG. 1, a controller 1 has a CPU (central processing unit) 25 as a microprocessor for CNC (computerized numerical control), a CPU 21 as a microprocessor for PC (programmable controller), a CPU as a microprocessor for servo control and a CPU 20 as a microprocessor for pressure monitor. The pressure monitor CPU 20 performs sampling on signals from pressure sensors for detecting various pressure including an injection pressure on mechanisms of the injection molding machine through an A/D converter 12, and stores the sampled data in a RAM 14. The microprocessors transfer information with one another through a bus 30 by appropriately selecting mutual input/output.

The PC CPU 21 is connected with a ROM 15 which stores a sequence program for controlling sequence motion of the injection molding machine, and a RAM 16 for temporary storage of computing data. The CNC CPU 25 is connected with a ROM 27 storing an automatic operation program and a RAM 28 for temporary storage of computing data.

The servo CPU 22 is connected with a ROM 17 which stores a control program dedicated for servo control of a position loop, a speed loop and a current loop, and a RAM 18 for temporary storage of data. The pressure monitor CPU 20 is connected with a ROM 13 which stores a control program for the monitor CPU 20, and the RAM 14 which stores the pressure data detected by the various sensors as mentioned above. Further, the servo CPU 22 is connected with a servo amplifier 19 for driving a servomotor 10 for each axis for mold clamping, injection, screw rotation and ejecting mold products. The output of a position/velocity detector 11 associated with each servomotor 10 is fed back to the servo CPU 22. The present position of each axis is calculated by the servo CPU 22 based on the position feed back signals from the position/velocity detector 11 and stored to be updated in the present position storing register. In FIG. 1, only the servomotor 10 for driving the mold clamping mechanism and the associated position/velocity detector 11 for detecting the position of the movable mold based on a rotational position of the servomotor are shown, arrangement of servomotors and position/velocity detectors for other axes for the screw rotation, injection and ejecting mold products are the same as these for the mold clamping axis.

The interface 23 receives signals form limit switches provided on various parts of the injection molding machine and an operation panel, and transmits various commands to peripheral devices of the injection molding machine.

A manual data input device 29 with a CRT display is connected to the bus 30 through the CRT display circuit and has numeric keys for inputting numeric data and function keys for selecting function menus and inputting various data referring graphic images on the CRT display. Crystal display may be adopted as the display device in place of the CRT display.

The data storing RAM 24 is provided in the form of nonvolatile memory for storing molding data including molding conditions, various set values, parameters, macro variables. Tables for storing values of estimated disturbance torque, as described later, is provided in the data storing RAM 24.

With the above configuration, the PC CPU 21 controls a sequence motion of the injection molding machine, the CNC CPU 25 distributes motion commands for the servomotor for each axis based on the operation program and the molding conditions stored in the data storage RAM 24, and the servo CPU 22 performs a digital servo control including position loop, velocity loop and current loop controls based on the distributed motion commands for each axis and position/velocity feedback signals detected by the position/velocity detector.

The configuration of the controller for an injection molding machine is noway different from a conventional one and the mold protection device is constituted according to the present invention utilizing the controller of the above configuration.

The controller according to the present invention differs from the conventional one in that the data storage RAM 24 is provided with a table TA for storing the disturbance torques estimated by a disturbance torque estimating observer at every predetermined period in mold closing processes, a table TB for storing average values of the estimated disturbance torques, a table TC for storing upper limits of an allowable range of the disturbance torque defined based on the average values and a table TE for storing deviations between the estimated disturbance torques and the average values, and the ROM 17 stores a program for the disturbance torque estimating observer for estimating a disturbance torque exerted on the servomotor 10, and a program for discriminating an abnormal load in the mold closing process based on the estimated disturbance torques.

Figure 2:
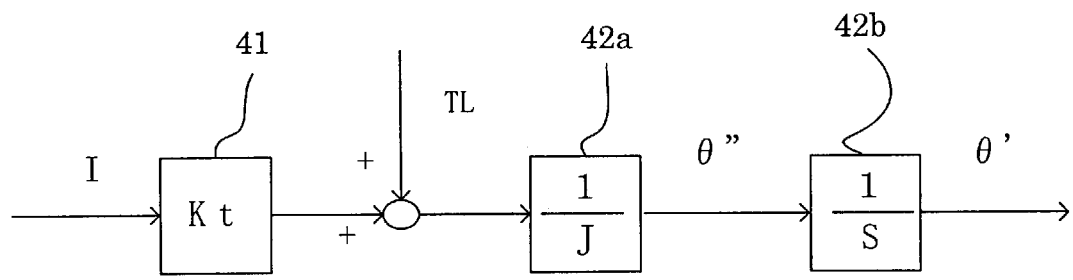
FIG. 2 is a block diagram of a servomotor control system to which a disturbance estimating observer is provided.

FIG. 2 is a block diagram of a disturbance estimating observer provided in a velocity loop of a control system for controlling the servomotor for mold clamping. A transfer function of the servomotor is represented by a term 41 of a torque constant Kt, and an integral term 16 of an inertia J. An torque command is represented by I, and a velocity and a disturbance torque are represented by θ' and TL, respectively, as state variables.

Equations of state regarding the state variables θ' and TL are expressed as follows;

$$\theta' = (1/J) \cdot TL + (Kt/J) \cdot I \qquad (1)$$

$$TL' = 0 \qquad (2)$$

where θ" represents an acceleration and TL' represents a rate of change of the disturbance torque TL. In the equation (2) TL' is set to "0" assuming that the rage of change is negligibly small in short time.

Figure 3:
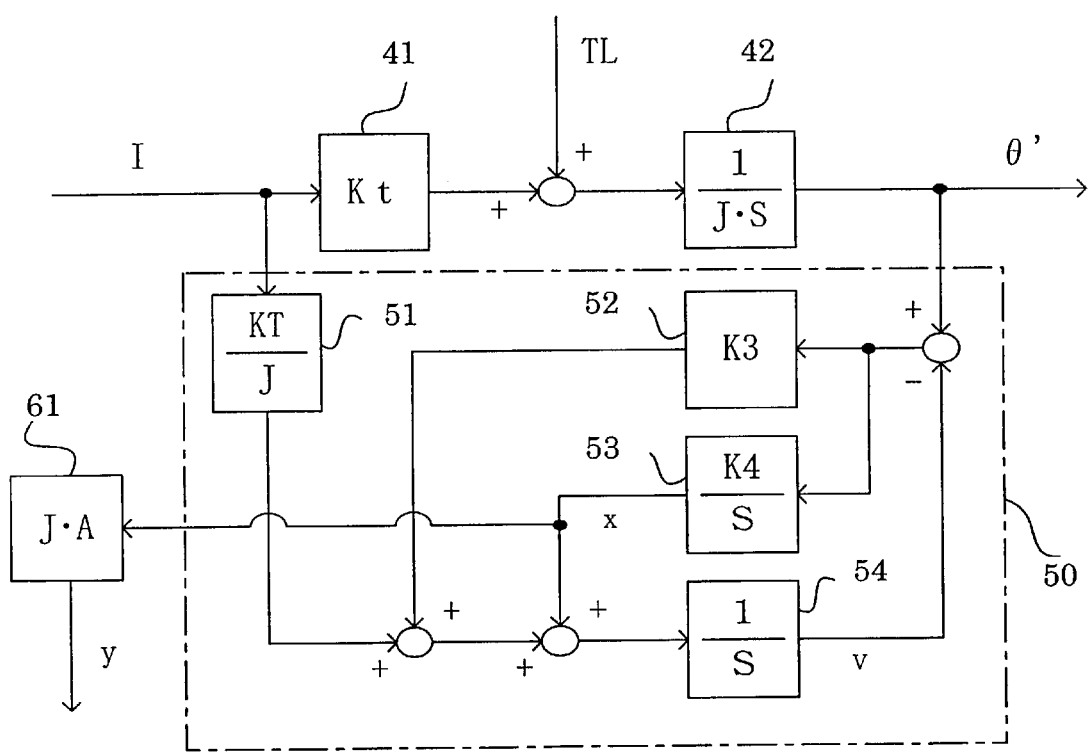
FIG. 3 is a block diagram showing a disturbance estimating observer provided in the servomotor control system as show in FIG. 2.

An observer 50 for estimating the velocity θ' and the disturbance TL is constituted as shown in FIG. 3 based on the above equations (1) and (2) in accordance with a common method of designing an observer. K3 and K4 in terms 52 and 53 are parameters of the disturbance estimating observer and KT/J in a term 51 represents a parameter to be multiplied by the current command I.

An output x of the term 53 in FIG. 3 is expressed by the following equation (3).

$$x = (\theta' - v) \cdot (K4/S) \quad (3)$$
$$= (TL/J) \cdot [K4(S^2 + K3 \cdot S + K4)]$$

The following equation (4) is obtained by selecting the parameters K3 and K4 so that the control system is stable in the equation (3).

$$x = TL/J \quad (4)$$

Thus, the value x which is proportional to the disturbance torque is estimated. The value x as an output of the observer 50 is multiplied by the parameter J·A (A is a constant for matching system of units) to obtain the disturbance torque y=TL. The processing of the disturbance estimating observer is described in detail in Japanese Patent Publication No. 4-368832, etc.

Hereinafter, the mold protection processing to be executed by the servo CPU 22 of the controller 1 as shown in FIG. 1, which functions as the mold protecting device, will be described referring to flowcharts of FIGS. 4 and 5.

Figure 7:
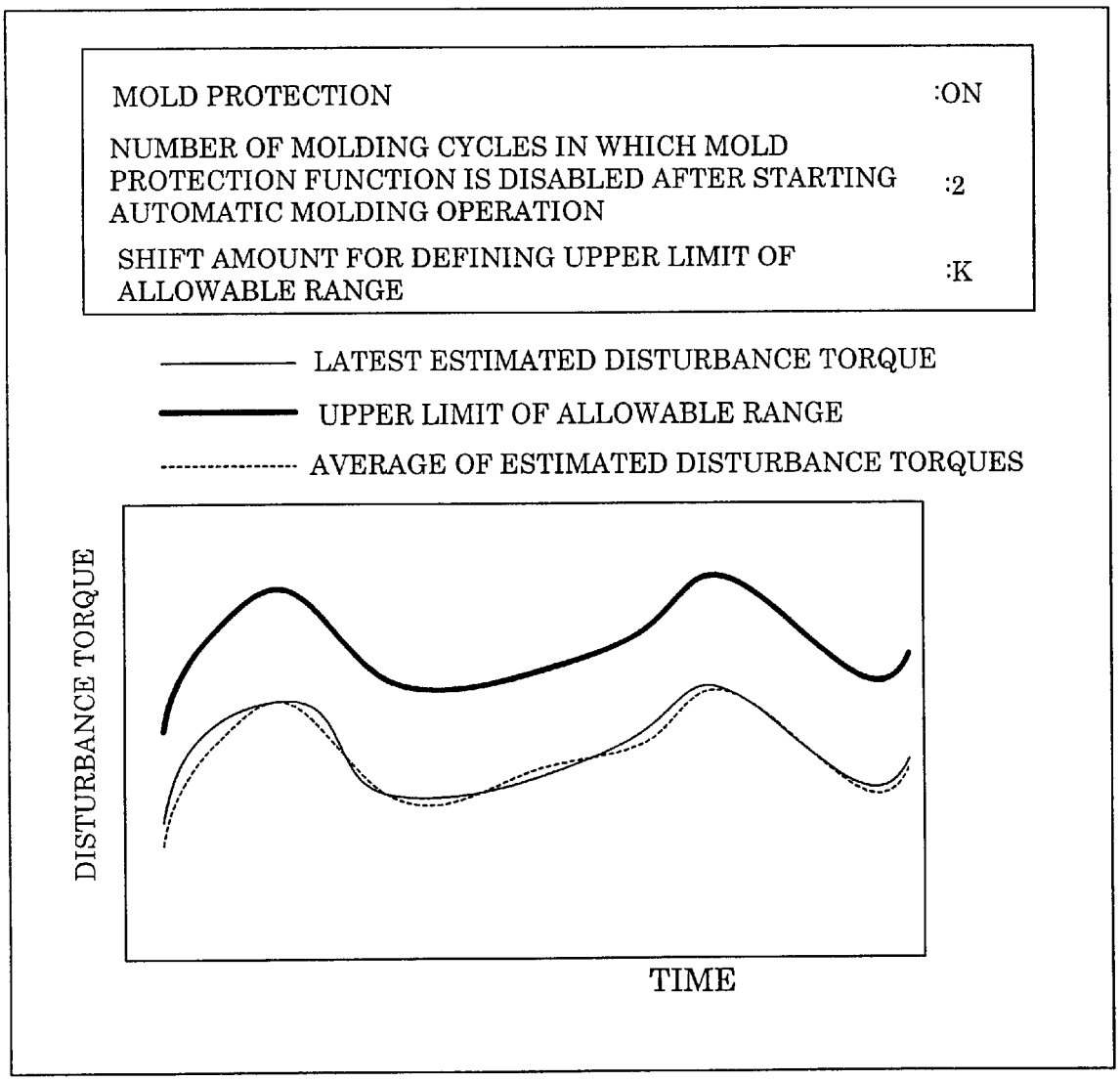
FIG. 7 is an example of images for setting conditions for the mold protection and waveforms of the disturbance torque displayed on a display device.

First, molding conditions and also conditions of the mold protection are set. FIG. 7 shows images for setting conditions of the mold protection displayed on the display device of the manual data input device 29. An operator refers the images on the display device to set the mold protection function to be effective or ineffective. In an example of FIG. 7, the mold protection function is set ON. In the case where the mold protection function is set ON, the number T of molding cycles during which the mold protection function is disabled from a start of an automatic molding operation is set. Immediately after a start of the automatic molding operation, friction of sliding members such as guide pins for a movable mold is not stable by fluctuation of temperature, etc. and therefore an estimated disturbance torque fluctuates. Therefore, the mold protection function is suspended in the set number T of molding cycles from a start of the automatic molding operation to wait until the estimated disturbance torque is stable in normal mold closing processes. The number T is set for the molding cycles after which the output torque of the servomotor 10 is stable. In the example of FIG. 7, the number T is set to two as the waiting molding cycles. Further, according to the present invention, a shift amount K to be added to an average value of the estimated disturbance values is set so as to define an upper limit of an allowable range of the disturbance torque. The shift amount K may be initially set to a value in which the molds are not damaged securely. As described later, the average of the estimated disturbance values obtained in the automatic molding operation is graphically displayed as a waveform on the display device as shown in FIG. 7, and an operator can re-set the shift amount K to define the maximum value in the allowable range in which the mold can not be damaged, referring the waveform of the average value.

Figure 4:
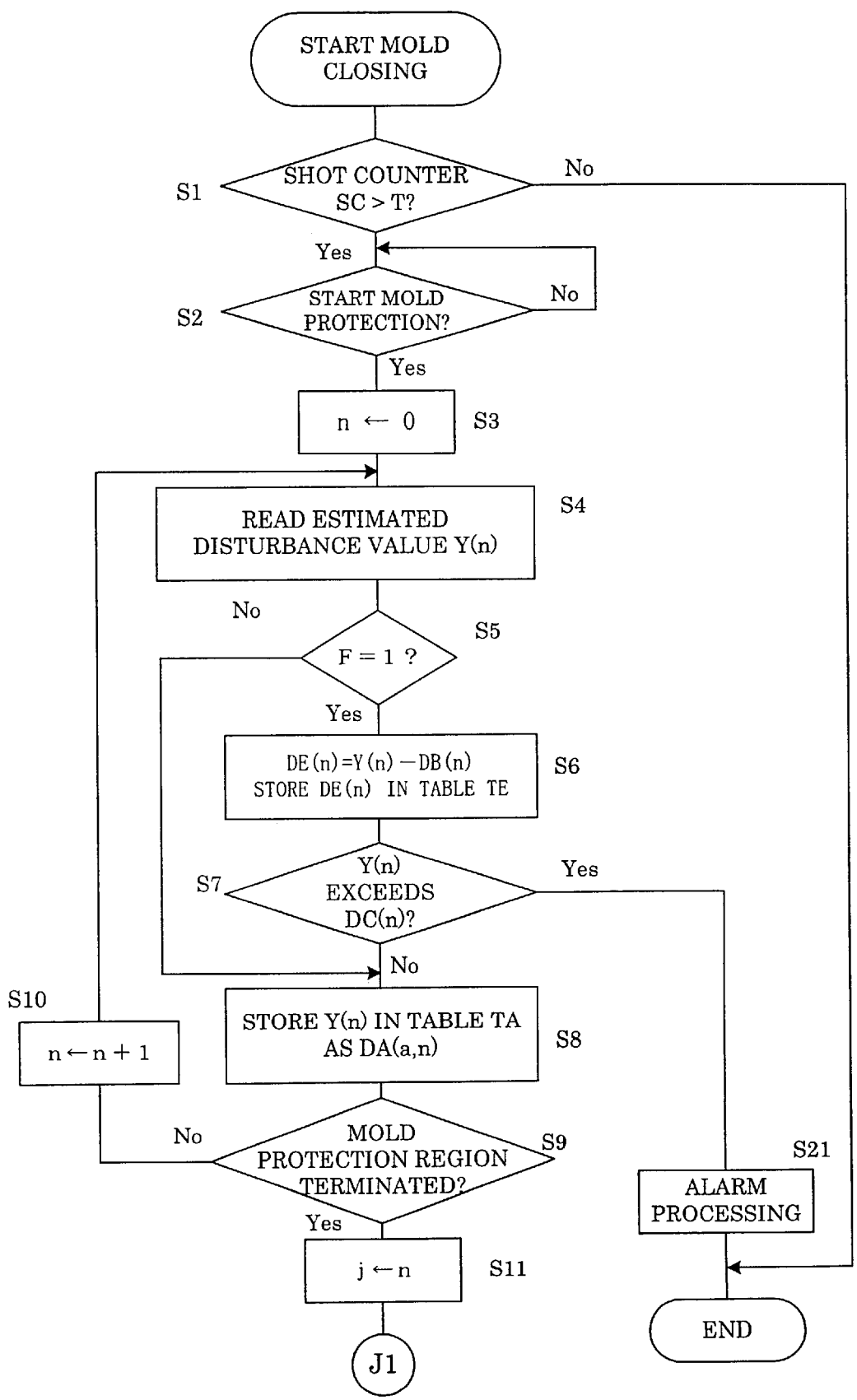
FIG. 4 is a flowchart of mold protecting processing according to an embodiment of the present invention.
Figure 5:
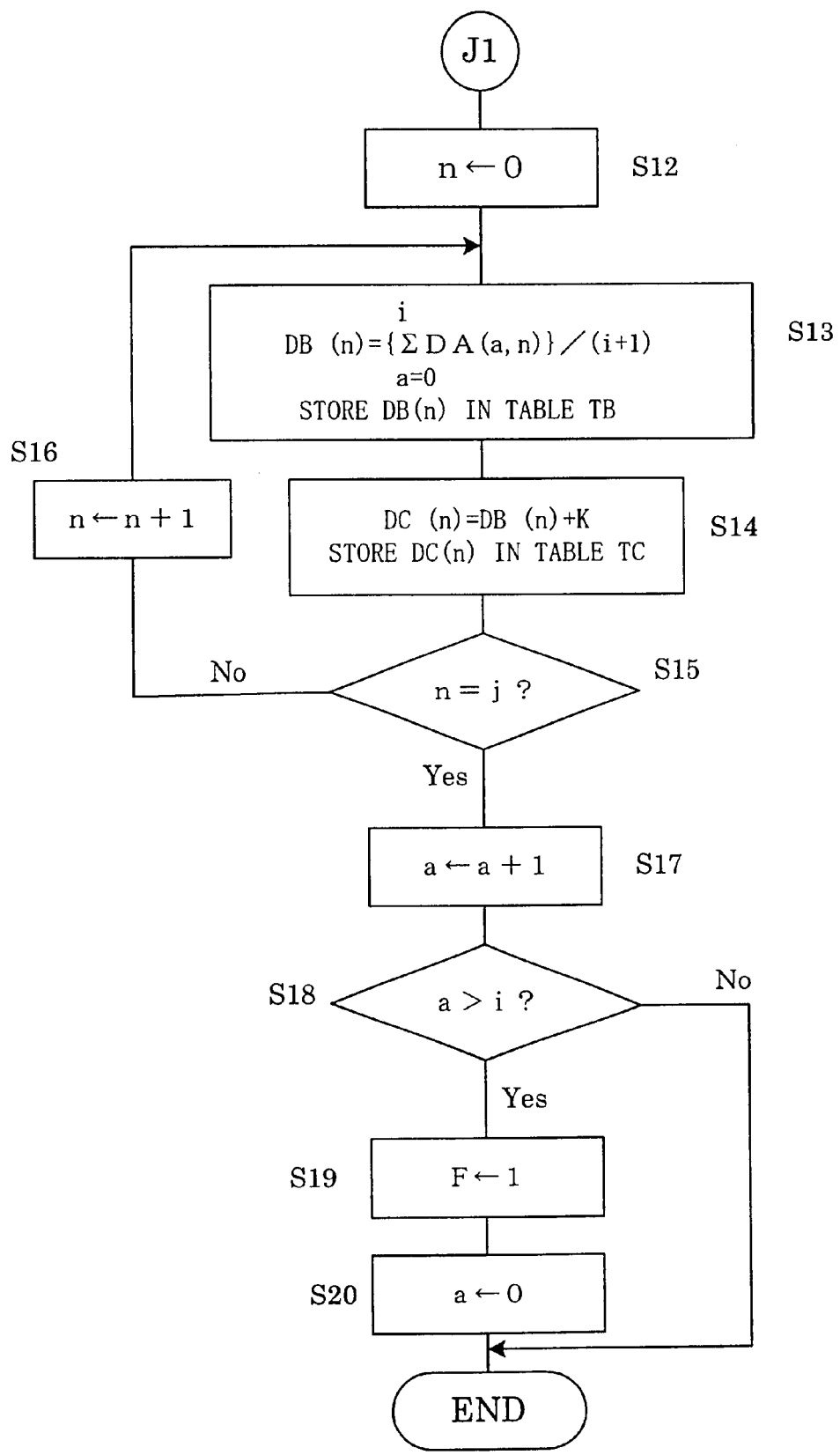
FIG. 5 is a continuation of the flowchart of FIG. 4.

When the automatic molding operation is started and enters a mold closing process, the servo CPU 22 starts the processing as shown in FIGS. 4 and 5. In an initial setting of the automatic molding operation, the servo CPU 22 sets a shot counter SC counting the number of injection molding cycles to be "1", a pointer "a", which indicates a storage position of data DA of an estimated disturbance value in the table TA, to be "0", and a flag F to be "0". Further, stored data in the tables TA, TB, TC and TE are all cleared.

When a mold closing process is started, the servo CPU 22 determines whether or not the shot counter SC exceeds the set number T of molding cycles in which the mold protection function is disable in. Step S1. If the shot counter SC does not exceed the set cycle number T, the mold protection processing in the mold closing process is terminated. The shot counter SC is incrementally increased by "1" every time when one molding operation (one molding cycle) is completed in processing other than this processing for the mold closing process.

The procedure does not inter further steps to wait until the shot counter SC exceeds the set cycle number T and when it is determined that the shot counter exceeds the set cycle number T in Step S1 and therefore it is deemed that the mold closing motion is stable, the procedure proceeds to Step S2 to determine whether or not the present position of the movable mold enters the mold protection region. The determination whether or not the present position is in the mold protection region is performed based on the value of the present position storage resister storing the present position obtained by the position feedback signal from the position/speed detector 11. The mold clamping mechanism driven by the servomotor 10 may be a direct-motion type clamping mechanism for directly clamping the molds via a ball screw/nut or a clamping mechanism employing a toggle mechanism. In the direct-motion type clamping mechanism, the rotational position of the servomotor 10 detected by the position/velocity detector 11 has linear relationship with the position of the movable mold and thus the position of the movable mold is directly detected by the rotational position of the servomotor 10. In the toggle type clamping mechanism, the position of a cross head of the toggle mechanism has linear relationship with the rotational position of the servomotor 10, but the position of the movable mold is not in linear relation to the rotational position of the servomotor 10. In this case, however, the position of the movable mold and the rotational position of the servomotor 10 has one-to-one relationship and thus the position of the movable mold can be obtained based on the rotational position of the servomotor 10 using an appropriate function. Thus, a start of the mold protection processing is determined based on the rotational position of the servomotor 10 detected by the position/velocity detector 11.

When it is determined to start the mold protection processing in Step S2, the procedure proceeds to Step S3 to set an index "n" indicating the number of sampling cycles to "0" and then proceeds to Step S4 to read an estimated disturbance value Y(n) which is estimated by the processing of the disturbance estimating observer as shown in FIGS. 2 and 3 executed with velocity loop processing.

In the subsequent Step S5, it is determined whether or not the flag F is "1" and if the flag F is not "1" the procedure proceeds to Step S8. The flag F is set to "1" when all the data for calculating the average are obtained. Since the flag F remains the initial value of "0" until it is set to "1" in Step 19, the procedure proceeds to Step S8. In Step S8, the estimated disturbance value Y(n) read in Step S4 is stored in the table TA as data DA(a, n). In particular, the data DA(a, n) is stored in the table TA at an address (a, n) designated by the index "a" showing the number of mold closing processes, i.e., molding operation cycles after starting the mold protection processing and the index "n" showing the number of sampling cycles in the mold protection region.

It is determined whether or not the mold protection region has been passed in Step S9 and if the mold protection region has not been passed, the index "n" is incrementally increased by "1" at Step S10 to return to Step S4. The determination whether the mold protection region has been passed or not is carried out based on the position of the servomotor 10 detected by the position/velocity detector 11.

Subsequently, the processing of Steps S4, S5, S7, S9 and S10 are repeatedly executed at every predetermined sampling period (the velocity loop processing period) and when the mold protection region is passed, the procedure proceeds to Step S11 to store the value of the index "n" as the total number "j" of the sampling cycles in the resistor.

Thus, the estimated disturbance Y(n) in the mold protection region is stored as data DA(a, n) in the table TA as shown in FIG. 6. Since the initial value of "a" is zero, the data of DA(0, 0) to DA(0, j) are stored in the table TA.

In the subsequent Step S12, the index "n" is cleared to "0" and the procedure enters Step S13 for obtaining an average DB(n) of the estimated disturbance values and then Step S14 for obtaining an upper limit DC(n) of the allowable range. Specifically, in Step S13 the estimated disturbance values at n-th sampling cycle obtained from 0-th mold closing process to i-th mold closing process are summed up and the sum is divided by the number (i+1) of the mold closing processes to obtain the average value DB(n), and the obtained average value DB(n) is stored in the table TG as shown in FIG. 6. The upper limit DC(n) of the allowable range is obtained by adding the set shift amount K to the average value DB(n) and stored in the table TC in Step S14. The index "n" is incrementally increased by "1" at Step S16 and the processing of Steps S13 and S14 are repeatedly executed until it is determined the index "n" is equal to the total number "j" of sampling cycles at Step S15. At the beginning of the automatic molding operation, since the table TA does not store all of the data, the average value DB(n) and the upper limit value DC(n) obtained in Steps S13 and S14 are not accurate but after the table TA contains all of the data obtained in the total number (i+1) of the mold closing processes, the obtained values are made accurate.

When the index "n" reaches the final number "j" of the sampling cycles, the procedure proceeds to Step S17 where the index "a" is incrementally increased by "1" and it is determined whether or not the index "a" exceeds the final number "i" of the mold closing processes to be stored in the table TA in Step S18. Namely, it is determined whether or not the data of the estimated disturbances are written at the final address "i" in the table TA. If the index "a" does not exceed the value of the final address i, the procedure does not proceed further Steps, to terminated the mold protection processing in the present mold closing process.

Every time when the mold closing process is started, the processing of Steps S1–S3, the repetitive processing of Steps S4, S5, S8–S10 and the processing of Steps S17 and S18 are executed. At the processing period with the index "a" of the value "i", the data DA(i, 0) to DA(i, j) of the estimated disturbance Y(n) are filled in the i-th column of the table TA. At that time, since all the estimated disturbance values sampled in the mold closing processes of the number (i+1) have been stored in the table TA, the average values DB(n) obtained in Steps S13–S16 and the upper limit DC(n) of the allowable range are made accurate.

The average value DB(n) is obtained in Step S13 as follows;

$$DB(0) = \{DA(0, 0) + DA(1, 0) + \cdots + DA(i, 0)\}/(i+1)$$

$$DB(1) = \{DA(0, 1) + DA(1, 1) + \cdots + DA(i, 1)\}/(i+1)$$

$$\vdots$$

$$DB(n) = \{DA(0, n) + DA(1, n) + \cdots + DA(i, n)\}/(i+1)$$

$$\vdots$$

$$DB(j) = \{DA(0, j) + DA(1, j) + \cdots + DA(i, j)\}/(i+1)$$

The upper limits of the allowable range obtained in Step S14 are defined by adding the shift amount K to the respective average values DB(0) to DB(j).

The index "a" is incrementally increased in Step S17 and if it is determined that the index "a" exceeds the value of "i" in Step S18, the procedure proceeds to Step S19 where the flag F is set to "1", and then to Step S20 where the index a is cleared to "0". Thus, after the data DA(a, n) are stored to the final column i in the table TA, new data DA(a, n) are stored at the first column of the address "0". As a result, the table TA stores the newest data obtained in the recent mold closing processes of the number (i+1) immediately before the present mold closing process.

In the subsequent mold closing process, since the flag F is set to "1", the procedure proceeds from Step S5 to Step S6 in which the average value DB(n) stored in the table TB is subtracted from the estimated disturbance value Y(n), so that a deviation between the estimated disturbance Y(n) and the average value DB(n) is obtained and stored in the table TE. In Step S7, it is determined whether or not the deviation exceeds the upper limit DC(n) of the allowable range stored in the table TC. If the deviation does not exceed the upper limit DC(n), the procedure proceeds to Step S8, and if the deviation exceeds the upper limit DC(n), the procedure proceeds to Step S21 for issuing an alarm signal indicating that an abnormal load is exerted on the molds so as to take a necessary alarm procedure and the mold protection processing is terminated.

As described above, the average value is renewed at every mold closing process by the calculation using the newest data of the estimated disturbance values obtained in the latest mold closing processes of the number (i+1). Also, the upper limit of the allowable range is determined to have a value obtained by adding the shift amount K to the latest average value. Even if the average value varies with change of temperature, etc., the optimum upper limit of the allowable range is automatically set. Further, since the upper limit of the allowable range, i.e., the reference value of determination of an abnormal load for the mold protection is automatically obtained based on the average value of the estimated disturbance values, and an abnormality is determined based on the obtained upper limit, in the case where a mold set is changed to new one, the optimum upper limit of the allowable range is automatically set without need of setting the reference value on the basis of experience and sense of an operator.

When the molds are changed, it is necessary to obtain at least data in shots of the number (i+1) to be stored in the table TA while monitoring whether or not the molds nip a foreign matter. After the data DA(0, 0) to DA(i, j) of the estimated disturbance values in the normal mold closing process are obtained, the estimated disturbance Y(n) exceeding the upper limit DC(n) is not stored in the table TA as seen form the flowchart of FIG. 4. Thus, since the estimated disturbances Y(n) obtained only in the normal mold closing processes are stored in the table TA and the upper limits of the allowable range are defined based on the average value obtained from the data stored in the table TA, the reliable upper limit value is always obtained.

Waveforms of the latest disturbance torques estimated in the mold protection region and stored in the table TA, and the data stored in the tables TB, TC and TE can be graphically displayed on the display device as shown in FIG. 7. In FIG. 7, a waveform of the latest estimated disturbance torques stored in the table TA (thin solid line), a waveform of the average value stored in the table TB (dotted line) and a waveform of the upper limit of the allowable range (thick solid line) are shown.

As shown in FIG. 7, since waveforms of the average value and upper limit of the allowable range are graphically displayed, an operator can re-set the shift amount K for shifting the average value to define the upper limit, to be optimum with ease.

Instead of or in addition to displaying the waveform of the latest estimated disturbance values in the mold protection region based on the data stored in the table TA, the data stored in the table TE may be graphically displayed in the display device. Since the data stored in the table TE represents the deviation between the estimated disturbance values in the newest mold closing process and the average value of the estimated disturbance values, and the waveform indicating the deviation from the average value is displayed to allow an operator to visually grasp the latest status easily.

In the present invention, the reference value for determining an abnormal load is not fixed to a constant value all over the mold protection region, the upper limit of the allowable range varies with change of position of the movable mold in the mold protection region, an abnormal load can be discriminated more precisely. For example, if the constant value is set all over the mold protection region, the constant reference value is too large to fail to detect an abnormal load at a particular position, and too small to erroneously detect an abnormal load at another position.

Contrary to the above, according to the present invention, since the upper limit of the disturbance load varies in the mold protection region, an abnormal load is discriminated more precisely in comparison with the discrimination using the constant reference value, so that the molds are more securely protected.

In the foregoing embodiment, the region in which the estimated disturbance torque is sampled and stored in the table TA and the region in which discrimination of an abnormal load is performed are coincide with each other, these regions can be set differently. In this case, the region of sampling needs to be set broader than the region of discriminating an abnormal load. For example, the region of the motion of the movable mold in which the estimated disturbance torque is sampled is set from a start potion to a mold touching position, and the region of the motion of the movable mold in which the discrimination of the abnormal load performed is set to from the start position to a position slightly before the mold touching position. As described above, the estimated disturbance torque out of the allowable range is not stored in the table TA and only the estimated disturbance torque within the allowable range in a normal mold closing motion is stored in the table TA. Since the velocity of the movable mold generally remains constant in the normal mold closing process, the number of sampling cycles (value of "j") are substantially constant in the normal mold closing process. In order to cope with the case where the velocity of the movable mold varies slightly in the normal mold closing process so that the number of sampling cycles (value of "j") varies, the region in which the disturbance torque is sampled is set broader than the region in which an abnormal load is discriminated. With this setting, an abnormal load can be more reliably discriminated since the average value which is the basis for defining the upper limit of the allowable range of the disturbance torque is obtained more precisely.

In the foregoing embodiment, the changes of the latest estimated disturbance torque, the average of the estimated disturbance torques and the upper limit of the allowable range in the mold protection region are graphically displayed as functions of time. However, these changes are expressed as functions of the position of the movable mold or the cross head of the mold clamping mechanism. Since the rotational position of the servomotor 10 detected by the position/velocity detector 11 has one-to-one relationship with the position of the movable mold or the cross head driven by the servomotor 10, the average value and the upper limit can be graphically displayed as functions of the position of the servomotor 10 detected by the position/velocity detector 11. In this case, the estimated disturbance torque is stored every time when the servomotor rotates a predetermined rotational amount in the mold protection region and the average and the upper limit are graphically displayed based on the stored data, and the discrimination of an abnormal load is performed on the basis of the angular position of the servomotor.

Alternatively, the sampling of the estimated disturbance torque is performed at every predetermined sampling period and the rotational position of the servomotor 10 at every sampling period is stored, and the estimated disturbance torque can be displayed on the basis of the rotational position of the servomotor 10. The average value of the estimated torques at respective predetermined positions may be obtained and graphically displayed by interpolations based on the estimated torques and the positions of the servomotors at respective sampling periods, or by regarding the estimated disturbance torque of the position nearest to respective predetermined position to be the estimated disturbance torque at the predetermined respective position.

According to the present invention, the reference value for discrimination of an abnormal load is automatically obtained based on an average value of the estimated disturbance torques sampled lately in normal mold closing motions, and an abnormal load is discriminated based on the updated reference value, so that an operator need not to perform manual setting of the reference value which requires high experience and sense. Further, since the average value is obtained based on the data sampled in normal mold closing motions only and the discrimination of an abnormal load is performed based on the upper limit of the allowable range defined based on the average value, an abnormal load is discriminated more reliably and precisely so that the molds are surely protected in the mold closing process. In addition, since the upper limit of the allowable range is not set to a fixed value but as a waveform in the mold protecting region, optimum values of the upper limit is set for respective positions of the movable mold in the mold closing process.

What is claimed is:

1. A mold protection device for an injection molding machine having a mold claiming mechanism driven by a servomotor, comprising:

a disturbance estimating observer to estimate a disturbance torque exerted on the servomotor at least within a mold protection region in every mold closing process;

a controller to define an upper limit value of the disturbance torque based on an average value of disturbance torques estimated by said disturbance estimating observer in a plurality of mold closing processes, and to issue an abnormal signal when a disturbance torque estimated by said disturbance estimating observer in a present mold closing process exceeds the upper limit value in the mold protection region.

2. A mold protection device for an injection molding machine according to claim 1, wherein said disturbance estimating observer estimates the disturbance torque at every predetermined period, and said controller defines an upper limit value for each predetermined period based on an average value of disturbance torques estimated at each predetermined period in a plurality of mold closing processes, and issues an abnormal signal when a disturbance torque estimated in a present mold closing process exceeds the upper limit for each predetermined period.

3. A mold protection device for an injection molding machine according to claim 1, wherein said controller defines the upper limit based on an average of disturbance torques estimated in a latest series of mold closing processes.

4. A mold protection device for an injection molding machine according to claim 1, wherein a disturbance torque estimated in a mold closing process in which an abnormal signal is issued is excluded in calculation of the average value.

5. A mold protection device for an injection molding machine according to claim 1, further comprising a manual data input device for inputting a set value for defining the upper limit value in combination with the average value, and a display device for graphically displaying the estimated disturbance torque in the present mold closing process, the average value and the upper limit vale in relation to time or a position of a movable mold.

6. A mold protection device for an injection molding machine according to claim 1, further comprising a manual data input device for inputting a set value for defining the upper limit value in combination with the average value, and a display device for graphically displaying a deviation between the average value and the disturbance torque estimated in a present mold closing process and the upper limit value in relation to time or a position of a movable mold.

7. A mold protection device for an injection molding machine according to claim 1, wherein the estimated disturbance torques in a predetermined number of first molding cycles of an automatic injection molding operation are excluded in calculation of the average value.

8. A mold protection device for an injection molding machine according to claim 7, further comprising a manual data input device for inputting the predetermined number of first molding cycles.

* * * * *

UNITED STATES PATENT AND TRADEMARK OFFICE
CERTIFICATE OF CORRECTION

PATENT NO. : 6,409,495 B1
DATED : June 25, 2002
INVENTOR(S) : Masao Kamiguchi et al.

It is certified that error appears in the above-identified patent and that said Letters Patent is hereby corrected as shown below:

Column 2,
Line 42, change "vale" to -- value --.

Column 4,
Line 17, change "noway" to -- no way --.

Column 6,
Line 2, delete "." after "in"

Column 8,
Line 51, change "form" to -- from --.

Column 11,
Line 17, change "vale" to -- value --.

Signed and Sealed this

Twentieth Day of August, 2002

Attest:

JAMES E. ROGAN
Attesting Officer
Director of the United States Patent and Trademark Office

UNITED STATES PATENT AND TRADEMARK OFFICE
CERTIFICATE OF CORRECTION

PATENT NO. : 6,409,495 B1
DATED : June 25, 2002
INVENTOR(S) : Masao Kamiguchi et al.

It is certified that error appears in the above-identified patent and that said Letters Patent is hereby corrected as shown below:

<u>Column 10,</u>
Line 45, change "claiming" to -- clamping --.

Signed and Sealed this

Third Day of December, 2002

JAMES E. ROGAN
*Director of the United States Patent and Trademark Office*